(12) United States Patent
Saori (10) Patent No.: US 7,283,311 B2
(45) Date of Patent: Oct. 16, 2007

(54) WIDE-ANGLE ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/550,118

(22) Filed: Oct. 17, 2006

(65) Prior Publication Data
US 2007/0091461 A1    Apr. 26, 2007

(30) Foreign Application Priority Data
Oct. 19, 2005    (JP) .......................... P2005-304966

(51) Int. Cl.
G02B 15/14 (2006.01)

(52) U.S. Cl. ...................... 359/687; 359/715; 359/740; 359/774

(58) Field of Classification Search ................ 359/687, 359/715, 740, 774
See application file for complete search history.

(56) References Cited

U.S. PATENT DOCUMENTS 6,462,885 B2   10/2002   Nishio
6,519,094 B1 *  2/2003   Boku et al. ................ 359/687

FOREIGN PATENT DOCUMENTS

| JP | 8-179212 | 7/1996 |
|----|----------|--------|
| JP | 2001-166208 | 6/2001 |
| JP | 2003-140048 | 5/2003 |
| JP | 2003-202499 | 7/2003 |
| JP | 2003-295060 | 10/2003 |

OTHER PUBLICATIONS

U.S. Appl. No. 11/427,046 to Saori, which was filed on Jun. 28, 2006.
U.S. Appl. No. 11/427,075 to Saori, which was filed on Jun. 28, 2006.
U.S. Appl. No. 11/427,100 to Saori, which was filed on Jun. 28, 2006.
U.S. Appl. No. 11/427,127 to Saori, which was filed on Jun. 28, 2006.
English language Abstract of JP 2003-295060.
English language Abstract of JP2003-202499.
English language Abstract of JP 2003-140048.
English language Abstract of JP2001-166208.
English language Abstract of JP 8-179212.

* cited by examiner

*Primary Examiner*—Evelyn A. Lester
(74) *Attorney, Agent, or Firm*—Greenblum & Bernstein, P.L.C.

(57) ABSTRACT

A wide-angle zoom lens system includes a positive first lens group, a negative second lens group, a positive third lens group and a positive fourth lens group, in this order from the object. Upon zooming from the short focal length extremity to the long focal length extremity, a distance between the positive first lens group and the negative second lens group increases, a distance between the negative second lens group and the positive third lens group decreases, and a distance between the positive third lens group and the positive fourth lens group decreases. The wide-angle zoom lens system satisfies a number of conditions.

6 Claims, 9 Drawing Sheets

-0.5   0.5
SPHERICAL
ABERRATION

THE SINE
CONDITION

-0.5   0.5
SPHERICAL
ABERRATION

CHROMATIC
ABERRATION

—— d Line
------ g Line
—— C Line

Fig.6C
W=41.7°

-0.05   0.05
LATERAL
CHROMATIC
ABERRATION

Fig.6D
W=41.7°

-0.5   0.5
ASTIGMATISM

-5 (%) 5
DISTORTION

——d Line
------ g Line
——— C Line

—— S
-- M

-0.5   0.5
SPHERICAL
ABERRATION
THE SINE
CONDITION

-0.5   0.5
SPHERICAL
ABERRATION
CHROMATIC
ABERRATION

-0.05   0.05
LATERAL
CHROMATIC
ABERRATION

-0.5   0.5
ASTIGMATISM

-5  (%) 5
DISTORTION

WIDE-ANGLE ZOOM LENS SYSTEM

BACKGROUND OF THE INVENTION

1. Field of the Invention

The present invention relates to a wide-angle zoom lens system which is suitable for a single-lens reflex (SLR) camera, and especially suitable for a digital single-lens reflex camera.

2. Description of the Prior Art

In a digital SLR camera, the size of the imaging device is smaller than a frame size of the film for a silver-halide SLR camera. Therefore an optical system having a wider angle-of-view (shorter focal length) is necessary.

Various types of the above wide-angle zoom lens system have been known. In particular, as a wide-angle zoom lens system with a higher zoom ratio of 10 or more, the wide-angle zoom lens system of a four-lens-group arrangement, in which the positive, negative, positive and positive lens groups are provided in this order from the object, has been generally known.

The wide-angle zoom lens systems mentioned above have been designed for the image-plane size corresponding to the 135 (35 mm) film format. Therefore the maximum angle-of-view at the short focal length extremity is inevitably smaller, e.g., approximately 75°. Furthermore, in the case of a digital SLR camera having a smaller image plane (the imaging device), e.g., an APSC size image sensor, the angle-of-view at short focal length extremity is at most 55°.

SUMMARY OF THE INVENTION

The present invention is to provide a wide-angle zoom lens system of the four-lens-group arrangement, i.e., the positive, negative, positive and positive lens groups, in this order from the object; and the wide-angle zoom lens system is suitable for a digital SLR camera having a smaller imaging device, has an angle-of-view of approximately 80° at the short focal length extremity, and has a zoom ratio exceeding 8.

According to an aspect of the present invention, there is provided a wide-angle zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group) and a fourth lens group having a positive refractive power (hereinafter, a positive fourth lens group), in this order from the object.

Upon zooming from the short focal length extremity to the long focal length extremity, a distance between the positive first lens group and the negative second lens group increases, a distance between the negative second lens group and the positive third lens group decreases, and a distance between the positive third lens group and the positive fourth lens group decreases.

The wide-angle zoom lens system satisfies the following conditions:

$$6.0 < f1/fw < 8.0 \quad (1)$$

$$7.0 < |f1/f2| < 9.0 \; (f2<0) \quad (2)$$

$$2.5 < f3/fw < 4.5 \quad (3)$$

wherein f1 designates the focal length of the positive first lens group;

f2 designates the focal length of the negative second lens group;

f3 designates the focal length of the positive third lens group; and fw designates the focal length of the entire wide-angle zoom lens system at the short focal length extremity.

The wide-angle zoom lens system preferably satisfies the following condition:

$$1.0 < f3/f4 < 2.5 \quad (4)$$

wherein f3 designates the focal length of the positive third lens group; and f4 designates the focal length of the positive fourth lens group.

The positive third lens group of the wide-angle zoom lens system preferably includes a positive 3a-sub-lens group and a negative 3b-sub-lens group, in this order from the object.

The wide-angle zoom lens system preferably satisfies the following conditions:

$$1.0 < f4/f3a < 2.0 \quad (5)$$

$$0.2 < f2/f3b < 0.5 \quad (6)$$

wherein f4 designates the focal length of the positive fourth lens group;

f2 designates the focal length of the negative second lens group;

f3a designates the focal length of the positive 3a-sub-lens group (>0); and f3b designates the focal length of the negative 3b-sub-lens group(<0).

According to another aspect of the present invention, there is provided a wide-angle zoom lens system including a positive first lens group, a negative second lens group, a positive third lens group and a positive fourth lens group, in this order from the object.

Upon zooming from the short focal length extremity to the long focal length extremity, a distance between the positive first lens group and the negative second lens group increases, a distance between the negative second lens group and the positive third lens group decreases, and a distance between the positive third lens group and the positive fourth lens group decreases.

The positive third lens group includes a positive 3a-sub-lens group and a negative 3b-sub-lens group, in this order from the object.

The wide-angle zoom lens system preferably satisfies the following conditions:

$$1.0 < f3/f4 < 2.5 \quad (4)$$

$$1.0 < f4/f3a < 2.0 \quad (5)$$

$$0.2 < f2/f3b < 0.5 \quad (6)$$

wherein f3 designates the focal length of the positive third lens group;

f4 designates the focal length of the positive fourth lens group;

f2 designates the focal length of the negative second lens group;

f3a designates the focal length of the positive 3a-sub-lens group (>0); and f3b designates the focal length of the negative 3b-sub-lens group(<0).

In the positive third lens group, the negative 3b-sub-lens group, which is positioned on the image-side of the positive 3a-sub-lens group, preferably includes cemented lens elements having a positive lens element and a negative lens element.

The present disclosure relates to subject matter contained in Japanese Patent Application No. 2005-304966 (filed on Oct. 19, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 17:
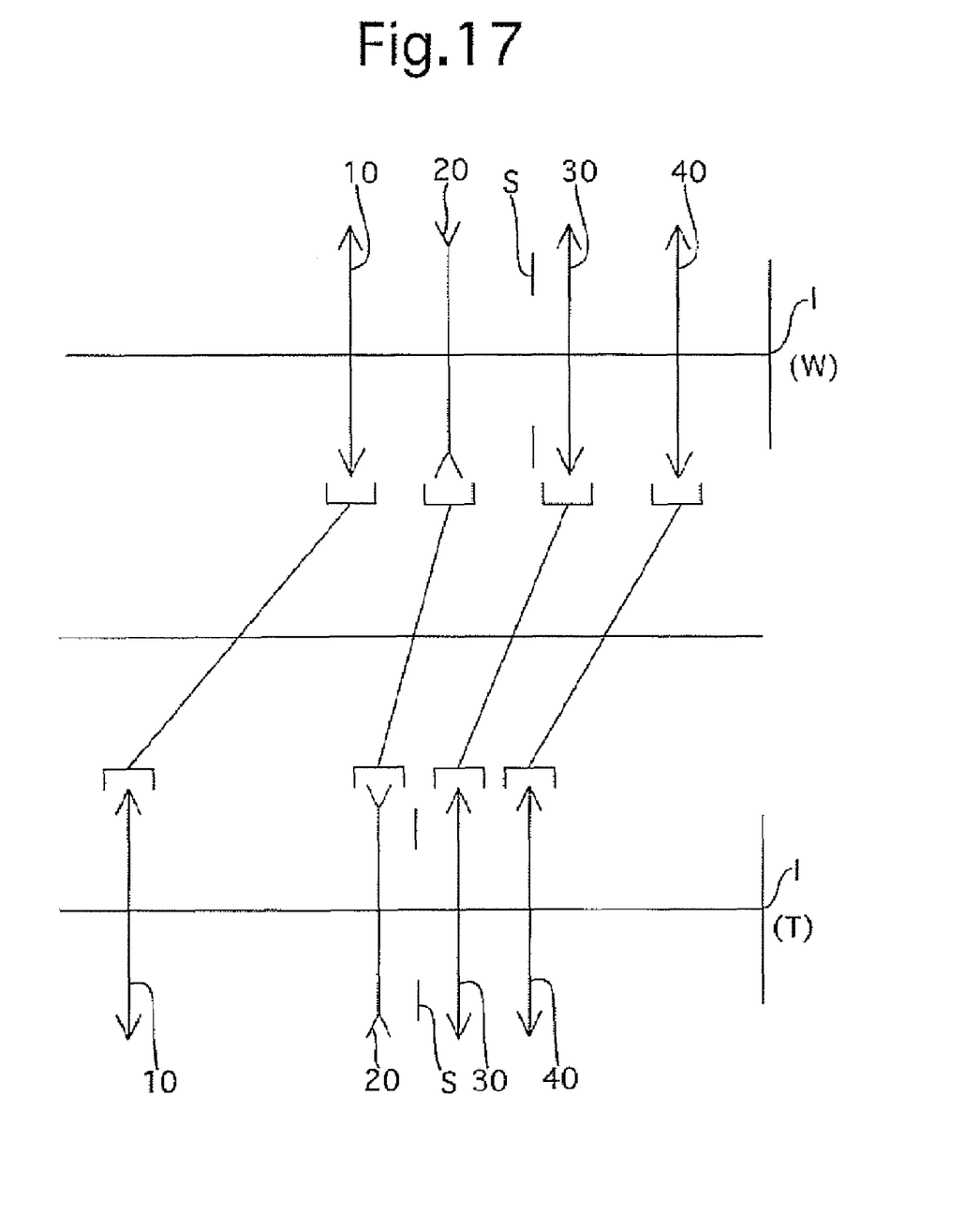
FIG. 17 is the schematic view of the lens-group moving paths for the wide-angle zoom lens system according to the present invention.

The wide-angle zoom lens system of the present invention, as shown in the zoom path of FIG. 17, includes a positive first lens group 10, a negative second lens group 20, a positive third lens group 30, and a positive fourth lens group 40, in this order from the object.

Upon zooming from the short focal length extremity (W) to the long focal length extremity (T), all the lens groups (10, 20, 30 and 40) move monotonically toward the object.

While the zooming is being performed, the distance between the positive first lens group 10 and the negative second lens group 20 increases; the distance between the negative second lens group 20 and the positive third lens group 30 decreases; the distance between the positive third lens group 30 and the positive fourth lens group 40 decreases; and the distance between the positive fourth lens group 40 and the image plane monotonically increases.

A diaphragm S is provided in front of the positive third lens group 30, and is arranged to move together with the positive third lens group 30.

Condition (1) specifies the ratio of the focal length of the positive first lens group 10 to the focal length of the entire wide-angle zoom lens system at the short focal length extremity.

If f1/fw exceeds the upper limit of condition (1), the refractive power of the positive first lens group 10 becomes too weak. Consequently, the size of the entire wide-angle zoom lens system becomes larger.

If f1/fw exceeds the lower limit of condition (1), the refractive power of the positive first lens group 10 becomes too strong. Consequently, spherical aberration, in particular, occurs largely.

Condition (2) specifies the ratio of the focal length of the positive first lens group 10 to the focal length of the negative second lens group 20, i.e., the ratio of the refractive power with respect to the positive first lens group 10 and the negative second lens group 20.

If f1/|f2| exceeds the upper limit of condition (2), the refractive power of the negative second lens group 20 becomes stronger. Consequently, light rays emit from the negative second lens group 20 largely diverge; and subsequently, the diverged light rays are converged by the positive third lens group 30 and the positive fourth lens group 40. Therefore spherical aberration largely occurs in the positive third lens group 30 and the positive fourth lens group 40.

If f1/|f2| exceeds the lower limit of condition (2), the negative refractive power of the negative second lens group 20 becomes too weak. Consequently, the correcting of aberrations occurred in other lens groups (the positive first lens group 10, the positive third lens group 30 and the positive fourth lens group 40) becomes difficult.

Condition (3) specifies the ratio of the focal length of the positive third lens group 30 to the focal length of the entire wide-angle zoom lens system at the short focal length extremity.

If f3/fw exceeds the upper limit of condition (3), the positive refractive power of the positive third lens group 30 becomes too weak, so that the traveling distance of the positive third lens group 30 becomes longer. Consequently, the size of the entire wide-angle zoom lens system becomes larger. As an alternative, the positive refractive power of the positive fourth lens group 40 could be made stronger; however, in such a case, coma and distortion largely occur, and the correcting thereof becomes difficult.

If f3/fw exceeds the lower limit of condition (3), the positive refractive power of the positive third lens group 30 becomes too strong. Consequently, spherical aberration and coma largely occur, and the correcting thereof becomes difficult.

Condition (4) specifies the ratio of the focal length of the positive third lens group 30 to the focal length of the positive fourth lens group 40, i.e., the ratio of the refractive power with respect to the positive third lens group 30 and the positive fourth lens group 40.

The third lens group 30 and the fourth lens group 40 both of which have a positive refractive power are arranged to function as a master lens (group) and the compensator lens (group), respectively; and condition (4) is to determine distribution (burden) of the positive refractive power over the third lens group 30 and the fourth lens group 40.

If f3/f4 exceeds the upper limit of condition (4), the positive refractive power of the positive fourth lens group 40 becomes too strong. Consequently, coma and distortion largely occur, and the correcting thereof becomes difficult.

If f3/f4 exceeds the lower limit of condition (4), the positive refractive power of the positive third lens group 30 becomes too strong. Consequently, the correcting of spherical aberration becomes difficult.

Condition (5) and condition (6) specify the positive third lens group 30 in the case where the positive third lens group 30 includes a positive 3a-sub-lens group and a negative 3b-sub-lens group, in this order from the object. The negative 3b-sub-lens group includes cemented lens elements having a positive lens element and a negative lens element, or a negative lens element and a positive lens element, which are cemented to each other, in this order from the object.

Furthermore, it should be understood that condition (5) relates to the fourth lens group 40 and the 3a-sub-lens group, both of which has a positive refractive power; and condition (6) relates to the second lens group 20 and the 3b-sub-lens group, both of which has a negative refractive power.

Condition (5) specifies the ratio of the focal length of the positive fourth lens group 40 to the focal length of the positive 3a-sub-lens group, i.e., the ratio of the refractive power with respect to the positive fourth lens group 40 and the positive 3a-sub-lens group.

If f4/f3a exceeds the upper limit of condition (5), the refractive power of the positive 3a-sub-lens group becomes too strong. Consequently, the correcting of spherical aberration cannot suitably be done.

If f4/f3a exceeds the lower limit of condition (5), the refractive power of the positive fourth lens group 40 becomes too strong. Consequently, coma and distortion largely occur, and the correcting thereof becomes difficult.

Condition (6) specifies the ratio of the focal length of the negative second lens group 20 to the focal length of the negative 3b-sub-lens group, i.e., the ratio of the refractive power with respect to the negative second lens group 20 and the negative 3b-sub-lens group.

Only the second lens group 20 and the 3b-sub-lens group are the negative lens groups in the wide-angle zoom lens system; therefore by satisfying condition (6), the negative refractive power in the wide-angle zoom lens system can be maintained in a well balanced manner.

If f2/f3b exceeds the upper limit of condition (6), the negative refractive power of the negative 3b-sub-lens group becomes too strong. Consequently, spherical aberration is overcorrected.

If f2/f3b exceeds the lower limit of condition (6), the negative refractive power of the negative second lens group 20 becomes too strong. Consequently, fluctuations in aberrations due to zooming becomes intolerably larger.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and ν designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 1:
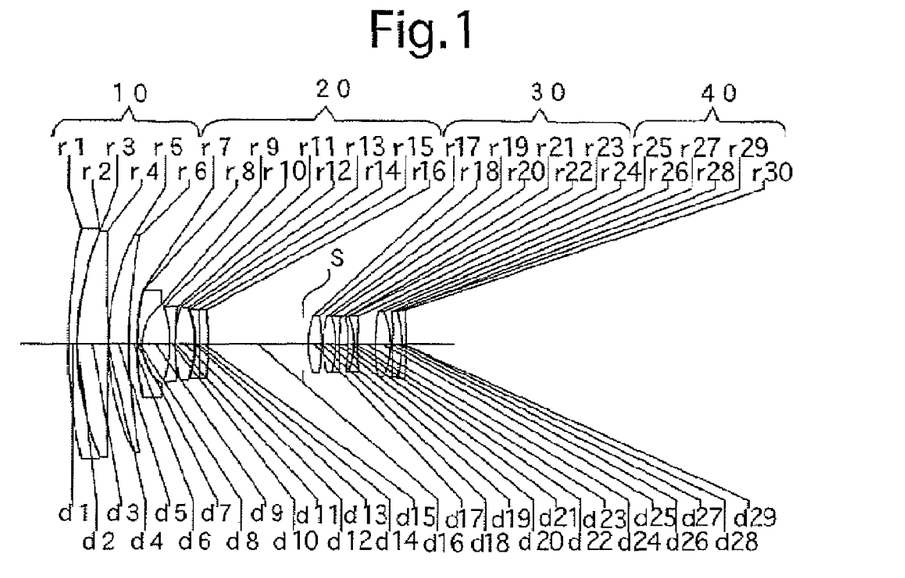
FIG. 1 is a lens arrangement of the wide-angle zoom lens system, at the short focal length extremity, according to a first embodiment of the present invention.
Figure 2A:
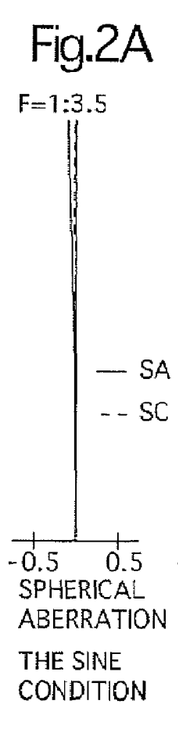
FIGS. 2A, 2B, 2C, 2D and 2E show aberrations occurred in the lens arrangement shown in FIG. 1.
Figure 2B:
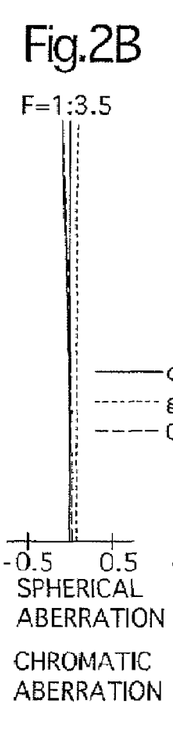
Figure 2C:
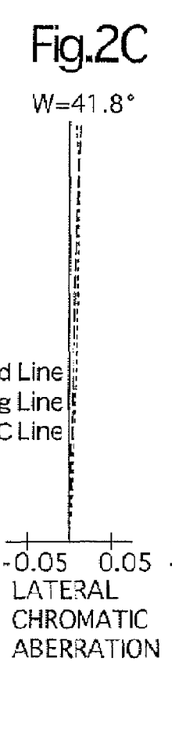
Figure 2D:
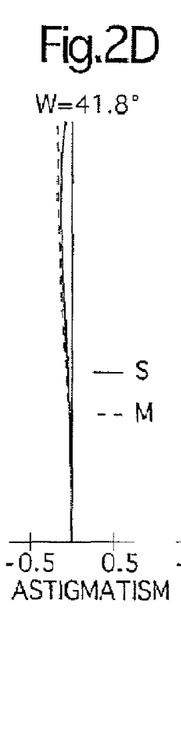
Figure 2E:
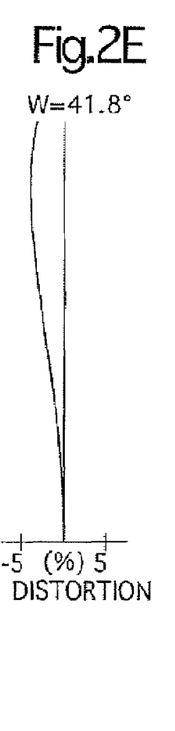

FIG. 1 is the lens arrangement of the wide-angle zoom lens system, at the short focal length extremity, according to the first embodiment of the present invention. FIGS. 2A through 2E show aberrations occurred in the lens arrangement shown in FIG. 1.

Figure 3:
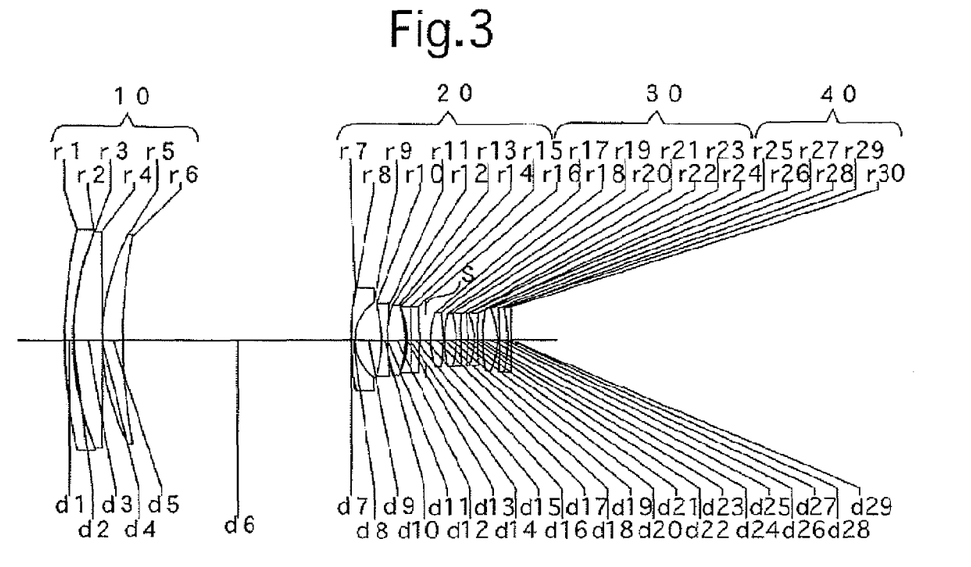
FIG. 3 is a lens arrangement of the wide-angle zoom lens system, at the long focal length extremity, according to the first embodiment of the present invention.
Figure 4A:
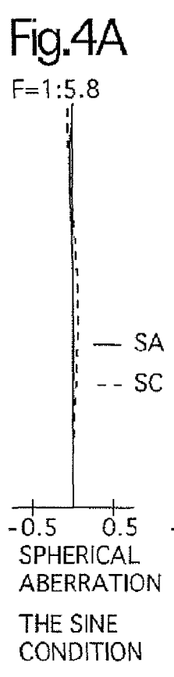
FIGS. 4A, 4B, 4C, 4D and 4E show aberrations occurred in the lens arrangement shown in FIG. 3.
Figure 4B:
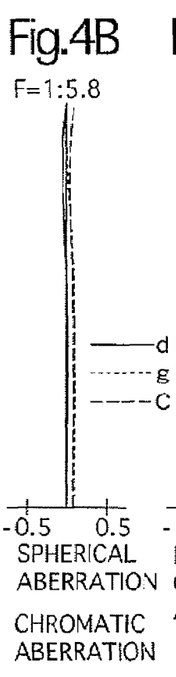
Figure 4C:
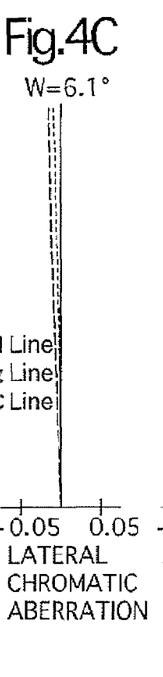
Figure 4D:
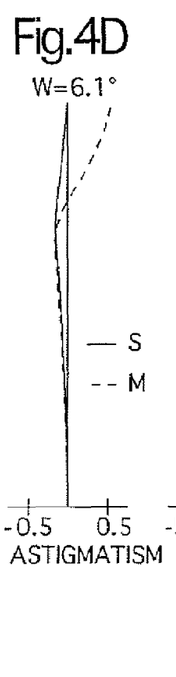
Figure 4E:
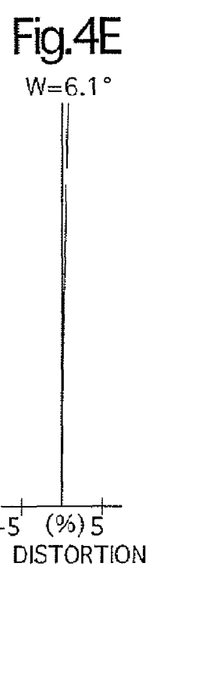

FIG. 3 is the lens arrangement of the wide-angle zoom lens system, at the long focal length extremity, according to the first embodiment of the present invention. FIGS. 4A through 4E show aberrations occurred in the lens arrangement shown in FIG. 3.

Table 1 shows the numerical data of the first embodiment.

The wide-angle zoom lens system of the first embodiment includes a positive first lens group 10, a negative second lens group 20, a diaphragm S, a positive third lens group 30, and a positive fourth lens group 40, in this order from the object.

The positive first lens group 10 includes a negative meniscus lens element having the convex surface facing toward the object, a positive biconvex lens element and a positive meniscus lens element having the convex surface facing toward the objects in this order from the object.

The negative second lens group 20 includes a negative meniscus lens element (the most object-side negative meniscus lens element) having the convex surface facing toward the object, a negative biconcave lens element, a positive biconvex lens element, and cemented lens elements having a negative meniscus lens element having the convex surface facing toward the image and a positive meniscus lens element having the convex surface facing toward the image, in this order from the object. Here, note that the most object-side negative meniscus lens element is provided with an aspherical layer made of a synthetic resin material on the most object-side surface thereof.

The positive third lens group 30 includes the positive 3a-sub-lens group and the negative 3b-sub-lens group, in this order from the object.

The positive 3a-sub-lens group includes a positive biconvex lens element, and cemented lens elements having a positive biconvex lens element and a negative biconcave lens element, in this order from the object.

The negative 3b-sub-lens group includes cemented lens elements having a positive meniscus lens element having the convex surface facing toward the image and a negative biconcave lens element, in this order from the object.

The positive fourth lens group 40 includes a positive biconvex lens element, another positive biconvex lens element and a negative meniscus lens element having the convex surface facing toward the image, in this order from the object.

The diaphragm S is provided 1.10 in front of the positive third lens group 30 (surface No. 17).

TABLE 1

FNO. = 1: 3.5-5.0-5.8
f = 16.48-50.00-131.27
W = 41.8-15.6-6.1
fB = 39.44-63.68-76.29

| Surf. No. | r | d | Nd | ν |
|---|---|---|---|---|
| 1 | 135.739 | 2.20 | 1.84666 | 23.8 |
| 2 | 75.977 | 0.23 | — | — |
| 3 | 77.159 | 7.70 | 1.49700 | 81.6 |
| 4 | −3283.505 | 0.20 | — | — |
| 5 | 62.945 | 5.37 | 1.77250 | 49.6 |
| 6 | 151.258 | 2.10-32.80-61.87 | — | — |
| 7* | 124.403 | 0.10 | 1.52700 | 43.7 |
| 8 | 65.008 | 1.10 | 1.83500 | 42.8 |
| 9 | 12.786 | 7.23 | — | — |
| 10 | −34.461 | 1.50 | 1.82123 | 44.0 |
| 11 | 78.832 | 0.11 | — | — |
| 12 | 36.104 | 4.77 | 1.84666 | 23.8 |
| 13 | −30.189 | 0.50 | — | — |
| 14 | −24.634 | 1.00 | 1.82955 | 43.8 |
| 15 | −571.302 | 2.20 | 1.80518 | 25.4 |
| 16 | −156.983 | 25.95-9.85-3.06 | — | — |
| 17 | 19.297 | 3.44 | 1.48750 | 70.2 |
| 18 | −56.037 | 0.50 | — | — |
| 19* | 24.853 | 3.19 | 1.48749 | 70.2 |
| 20 | −26.657 | 1.20 | 1.83312 | 35.0 |
| 21 | 121.075 | 2.00 | — | — |
| 22 | −50.018 | 1.69 | 1.80518 | 25.4 |
| 23 | −20.283 | 0.80 | 1.80400 | 46.6 |
| 24 | 85.511 | 4.68-2.41-1.49 | — | — |
| 25 | 46.496 | 4.01 | 1.48750 | 70.2 |
| 26 | −22.068 | 0.50 | — | — |
| 27* | 781.528 | 2.30 | 1.60276 | 52.1 |
| 28 | −39.535 | 0.00 | — | — |
| 29 | −40.570 | 0.00 | 1.84617 | 23.9 |
| 30 | −580.231 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.22678 \times 10^{-4}$ | $-0.49468 \times 10^{-7}$ | $0.65495 \times 10^{-10}$ |
| 19 | 0.00 | $-0.28095 \times 10^{-5}$ | | |
| 27 | 0.00 | $-0.39652 \times 10^{-4}$ | $-0.74562 \times 10^{-7}$ | $-0.57795 \times 10^{-9}$ |

Embodiment 2

Figure 5:
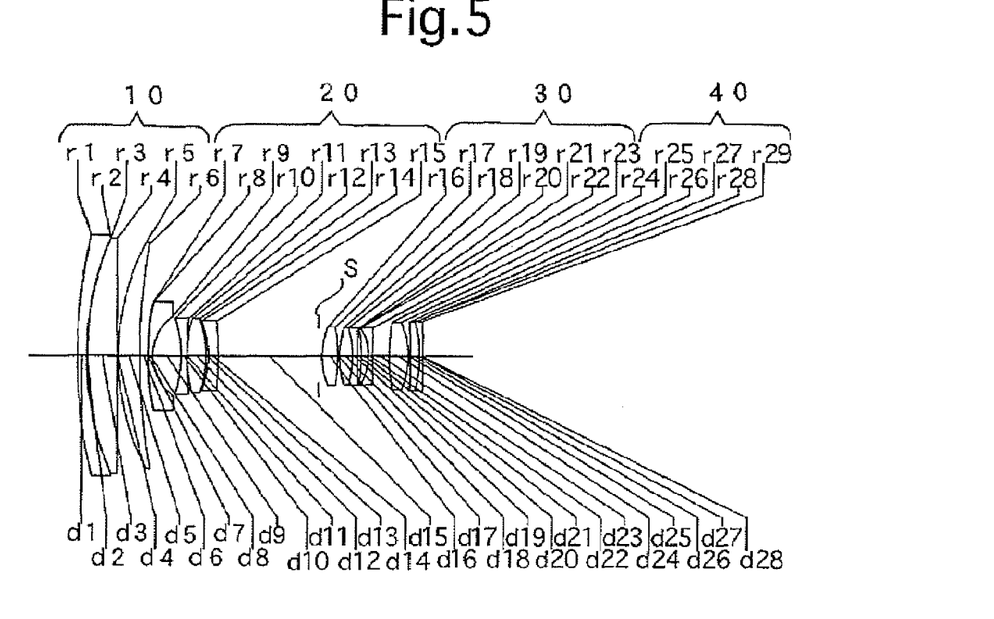
FIG. 5 is a lens arrangement of the wide-angle zoom lens system, at the short focal length extremity, according to a second embodiment of the present invention.
Figure 6A:
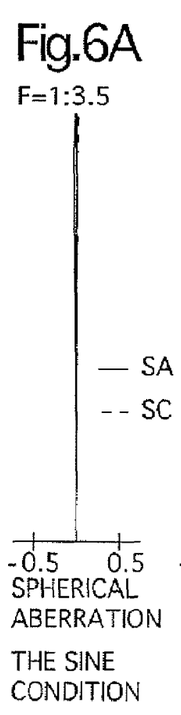
FIGS. 6A, 6B, 6C, 6D and 6E show aberrations occurred in the lens arrangement shown in FIG. 5.
Figure 6B:
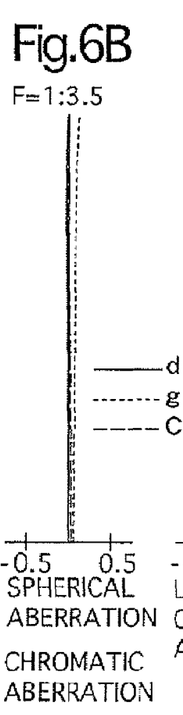
Figure 6C:
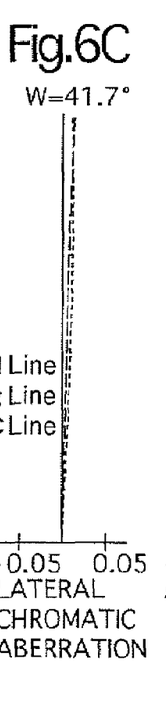
Figure 6D:
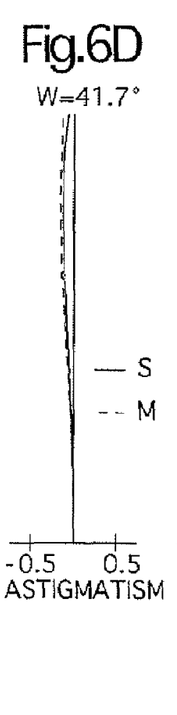
Figure 6E:
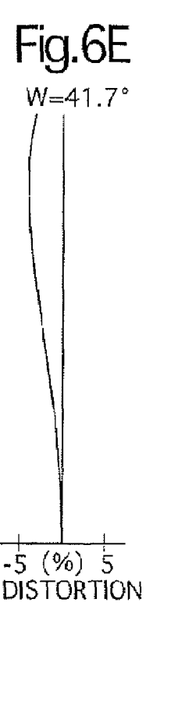

FIG. 5 is the lens arrangement of the wide-angle zoom lens system, at the short focal length extremity, according to a second embodiment of the present invention. FIGS. 6A through 6E show aberrations occurred in the lens arrangement shown in FIG. 5.

Figure 7:
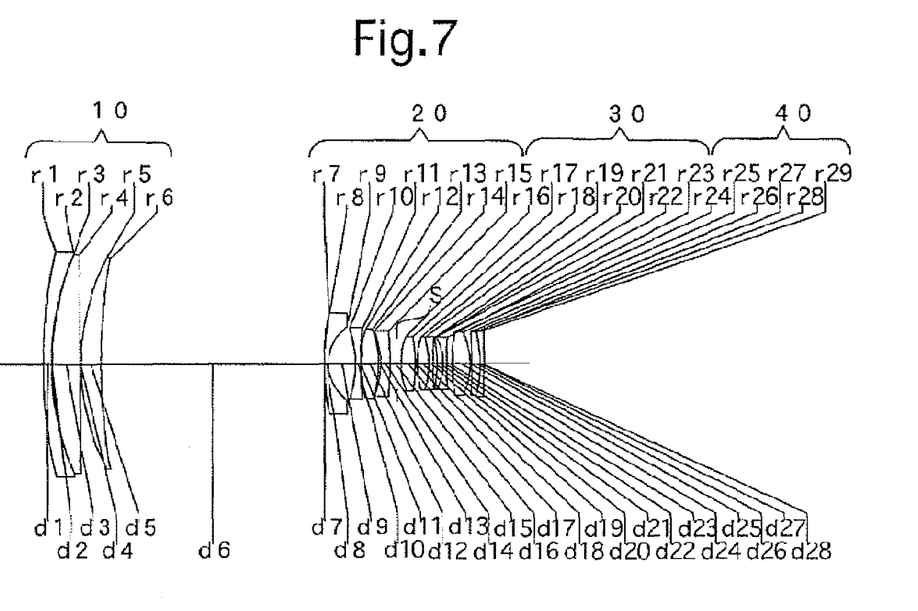
FIG. 7 is a lens arrangement of the wide-angle zoom lens system, at the long focal length extremity, according to the second embodiment of the present invention.
Figure 8A:
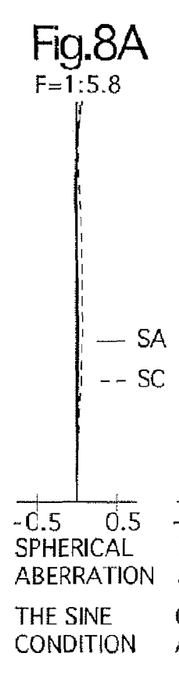
FIGS. 8A, 8B, 8C, 8D and 8E show aberrations occurred in the lens arrangement shown in FIG. 7.
Figures 8B, 8C:
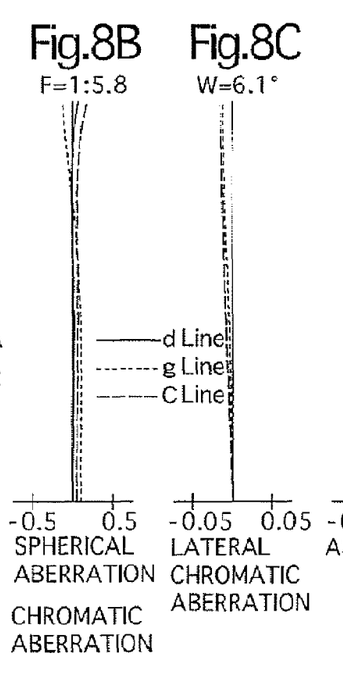
Figures 8D, 8E:
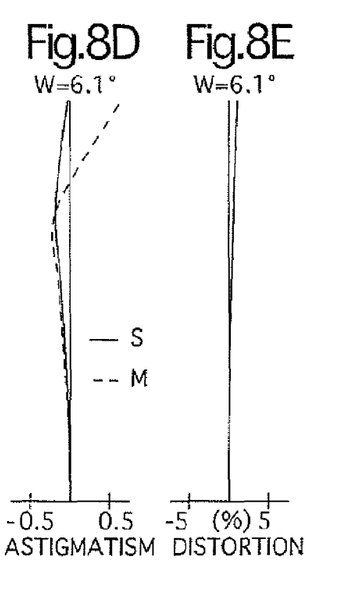

FIG. 7 is the lens arrangement of the wide-angle zoom lens system, at the long focal length extremity, according to the second embodiment of the present invention. FIGS. 8A through 8E show aberrations occurred in the lens arrangement shown in FIG. 7.

Table 2 shows the numerical data of the second embodiment.

With respect to the positive first lens group 10, the positive third lens group 30 and the positive fourth lens group 40, the basic lens arrangements thereof are the same as those of the first embodiment.

On the other hand, the negative second lens group 20 includes a negative meniscus lens element (the most object-side negative meniscus lens element in the negative second lens group 20) having the convex surface facing toward the object, a negative biconcave lens element, a positive biconvex lens element and a negative meniscus lens element having the convex surface facing toward the image, in this order from the object. Here, note that the most-object side negative meniscus lens element in the negative second lens group 20 is provided with an aspherical layer made of a synthetic resin material on the most object-side surface thereof.

The diaphragm S is provided 1.10 in front of the positive third lens group 30 (surface No. 16) on the optical axis.

TABLE 2

FNO. = 1: 3.5-4.9-5.8
f = 16.50-50.10-131.33
W = 41.7-15.6-6.1
fB = 39.53-62.60-76.31

| Surf. No. | r | d | Nd | ν |
|---|---|---|---|---|
| 1 | 139.682 | 2.20 | 1.84666 | 23.8 |
| 2 | 75.992 | 0.25 | — | — |
| 3 | 78.391 | 7.70 | 1.49700 | 81.6 |
| 4 | −4570.944 | 0.20 | — | — |
| 5 | 62.352 | 5.46 | 1.77250 | 49.6 |
| 6 | 161.088 | 2.10-33.56-61.06 | — | — |
| 7* | 115.906 | 0.10 | 1.52700 | 43.7 |
| 8 | 67.072 | 1.10 | 1.83481 | 42.7 |
| 9 | 12.527 | 7.23 | — | — |
| 10 | −34.164 | 1.50 | 1.83481 | 42.7 |
| 11 | 81.139 | 0.11 | — | — |
| 12 | 34.699 | 4.78 | 1.84666 | 23.8 |
| 13 | −30.340 | 0.63 | — | — |
| 14 | −24.084 | 2.44 | 1.79936 | 45.6 |
| 15 | −137.360 | 26.73-10.45-3.07 | — | — |
| 16 | 19.085 | 3.97 | 1.48700 | 70.2 |
| 17 | −54.588 | 0.50 | — | — |
| 18* | 25.073 | 3.26 | 1.48755 | 70.3 |
| 19 | −27.145 | 1.20 | 1.83243 | 38.0 |
| 20 | 121.546 | 1.00 | — | — |
| 21 | −50.404 | 1.80 | 1.78523 | 32.9 |
| 22 | −14.753 | 0.90 | 1.80400 | 46.6 |
| 23 | 88.783 | 4.27-2.19-1.47 | — | — |
| 24 | 46.867 | 4.93 | 1.49001 | 82.1 |
| 25 | −22.237 | 0.50 | — | — |
| 26* | 819.574 | 2.30 | 1.60547 | 41.8 |
| 27 | −40.146 | 0.00 | — | — |
| 28 | −40.271 | 1.00 | 1.84699 | 23.8 |
| 29 | −633.719 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.22966 \times 10^{-4}$ | $-0.47132 \times 10^{-7}$ | $0.59900 \times 10^{-10}$ |
| 18 | 0.00 | $-0.21485 \times 10^{-5}$ | | |
| 26 | 0.00 | $-0.39778 \times 10^{-4}$ | $-0.77766 \times 10^{-7}$ | $-0.57543 \times 10^{-9}$ |

Embodiment 3

Figure 9:
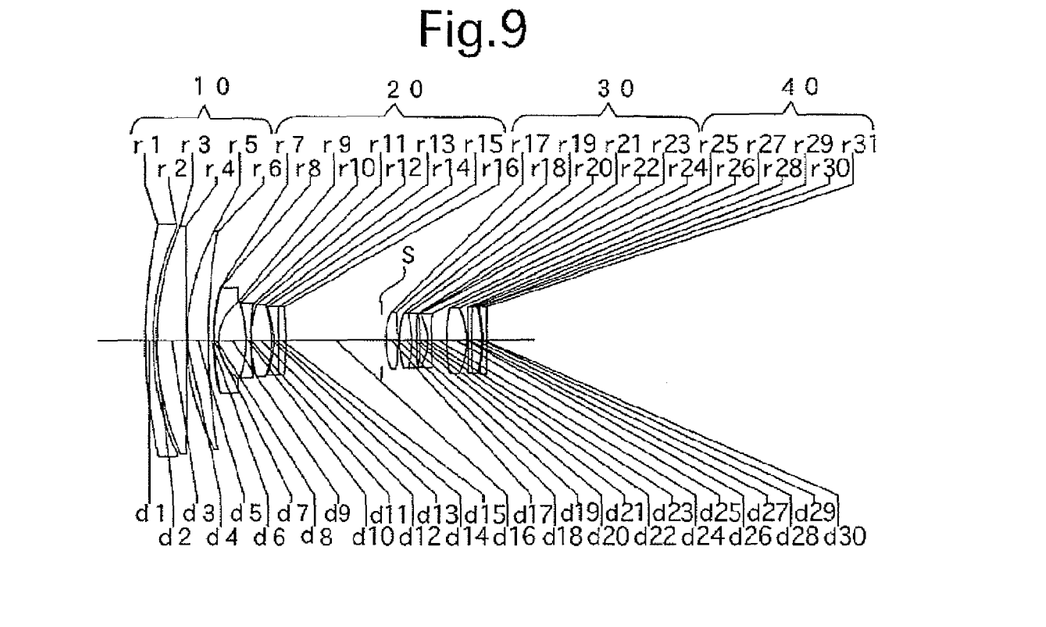
FIG. 9 is a lens arrangement of the wide-angle zoom lens system, at the short focal length extremity, according to a third embodiment of the present invention.
Figure 10A:
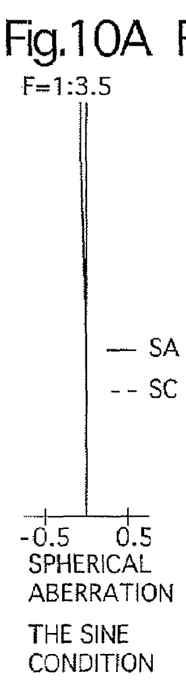
FIGS. 10A, 10B, 10C, 10D and 10E show aberrations occurred in the lens arrangement shown in FIG. 9.
Figure 10B:
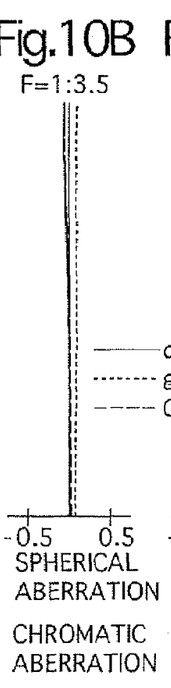
Figure 10C:
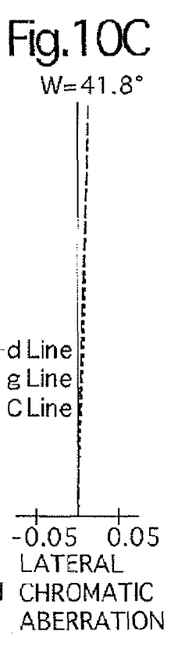
Figure 10D:
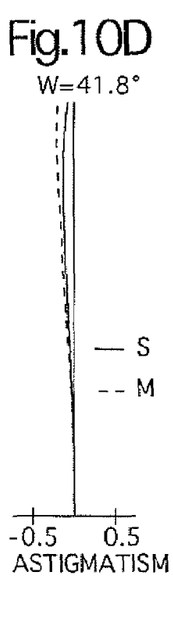
Figure 10E:
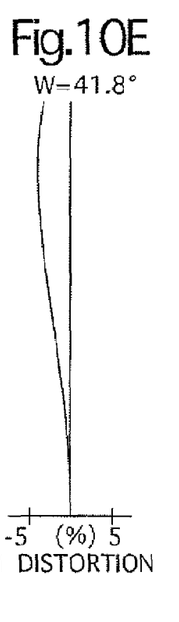

FIG. 9 is the lens arrangement of the wide-angle zoom lens system, at the short focal length extremity, according to the third embodiment of the present invention. FIGS. 10A through 10E show aberrations occurred in the lens arrangement shown in FIG. 9.

Figure 11:
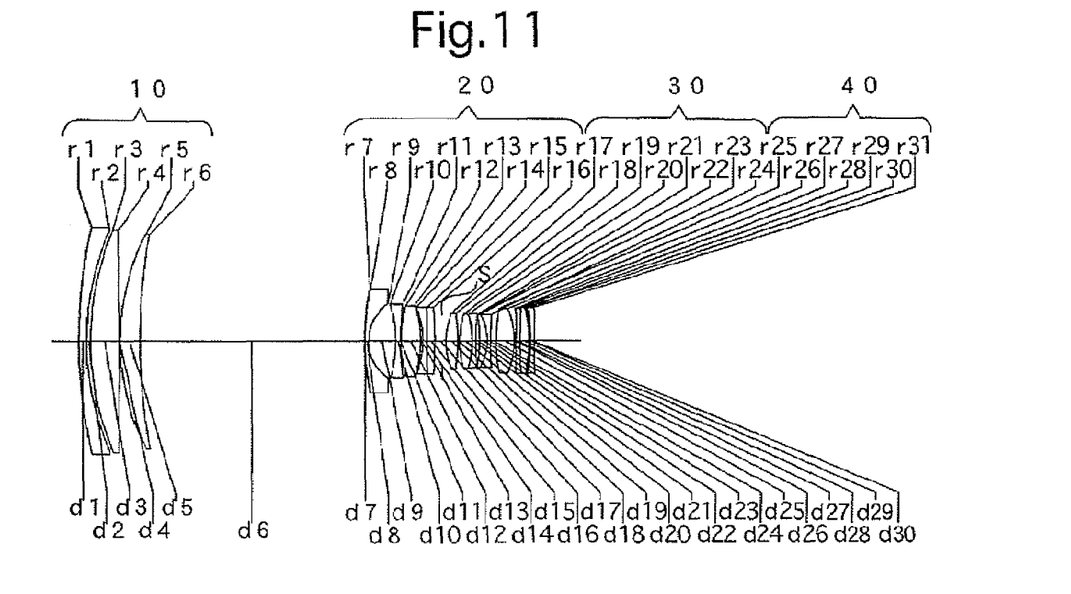
FIG. 11 is a lens arrangement of the wide-angle zoom lens system, at the long focal length extremity, according to the third embodiment of the present invention.
Figures 12A, 12B, 12C, 12D:
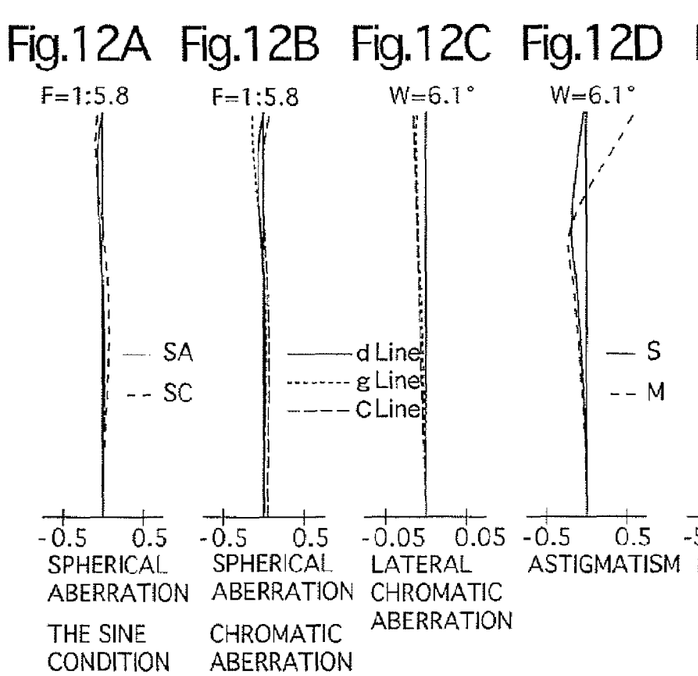
FIGS. 12A, 12B, 12C, 12D and 12E show aberrations occurred in the lens arrangement shown in FIG. 11.
Figure 12E:
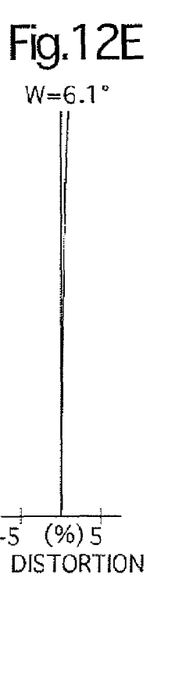

FIG. 11 is the lens arrangement of the wide-angle zoom lens system, at the long focal length extremity, according to the third embodiment of the present invention. FIGS. 12A through 12E show aberrations occurred in the lens arrangement shown in FIG. 11.

Table 3 shows the numerical data of the third embodiment.

With respect to the positive first lens group 10, the negative second lens group 20 and the positive third lens group 30, the basic lens arrangements thereof are the same as those of the first embodiment.

However, unlike the first embodiment, the cemented lens elements of the negative second lens group 20 in the third embodiment includes a positive planoconvex lens element and a negative planoconcave lens element, in this order from the object. The flat surfaces of these lens elements are cemented to each other to form a bonding surface.

The positive fourth lens group 40 includes a positive biconvex lens element, cemented lens elements having a negative meniscus lens element having the convex surface facing toward the object and a positive biconvex lens element, and a negative meniscus lens element having the convex surface facing toward the image, in this order from the object.

The diaphragm S is provided 1.10 in front of the positive third lens group 30 (surface No. 17) on the optical axis.

TABLE 3

FNO. = 1: 3.5-4.9-5.8
f = 16.49-50.03-131.11
W = 41.8-15.6-6.1
fB = 39.51-63.18-75.85

| Surf. No. | r | d | Nd | ν |
|---|---|---|---|---|
| 1 | 139.704 | 2.00 | 1.84666 | 23.8 |
| 2 | 74.874 | 1.08 | — | — |
| 3 | 77.759 | 7.71 | 1.49700 | 81.6 |
| 4 | -3648.112 | 0.20 | — | — |
| 5 | 62.118 | 5.46 | 1.77660 | 48.8 |
| 6 | 161.181 | 1.60-32.61-60.90 | — | — |
| 7* | 97.665 | 0.10 | 1.52700 | 43.7 |
| 8 | 53.300 | 1.10 | 1.83481 | 42.7 |
| 9 | 12.519 | 7.23 | — | — |
| 10 | -34.129 | 1.39 | 1.83481 | 42.7 |
| 11 | 82.239 | 0.11 | — | — |
| 12 | 34.564 | 5.28 | 1.84666 | 23.8 |
| 13 | -30.655 | 0.63 | — | — |
| 14 | -23.942 | 1.26 | 1.81465 | 45.8 |
| 15 | ∞ | 1.96 | 1.69564 | 37.4 |
| 16 | -115.577 | 26.64-10.23-2.96 | — | — |
| 17 | 19.359 | 3.24 | 1.48761 | 70.2 |
| 18 | -56.381 | 0.50 | — | — |
| 19* | 25.719 | 3.26 | 1.49007 | 83.9 |
| 20 | -26.504 | 1.20 | 1.83381 | 37.8 |
| 21 | 115.503 | 1.00-1.00-1.00 | — | — |
| 22 | -49.336 | 2.00 | 1.77790 | 28.3 |
| 23 | -14.943 | 0.90 | 1.80396 | 44.5 |
| 24 | 86.790 | 4.17-2.21-1.49 | — | — |
| 25 | 46.170 | 5.05 | 1.49486 | 82.3 |
| 26 | -21.962 | 0.50 | — | — |
| 27* | 793.078 | 1.00 | 1.61049 | 37.2 |
| 28 | 200.000 | 2.45 | 1.61400 | 58.4 |
| 29 | -38.636 | 0.50 | — | — |
| 30 | -40.199 | 1.00 | 1.82471 | 28.5 |
| 31 | -2323.563 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.22412 \times 10^{-4}$ | $-0.44784 \times 10^{-7}$ | $0.61590 \times 10^{-10}$ |
| 19 | 0.00 | $-0.14370 \times 10^{-5}$ | $0.14514 \times 10^{-7}$ | |
| 27 | 0.00 | $-0.37748 \times 10^{-4}$ | $-0.72698 \times 10^{-7}$ | $-0.49718 \times 10^{-9}$ |

Embodiment 4

Figure 13:
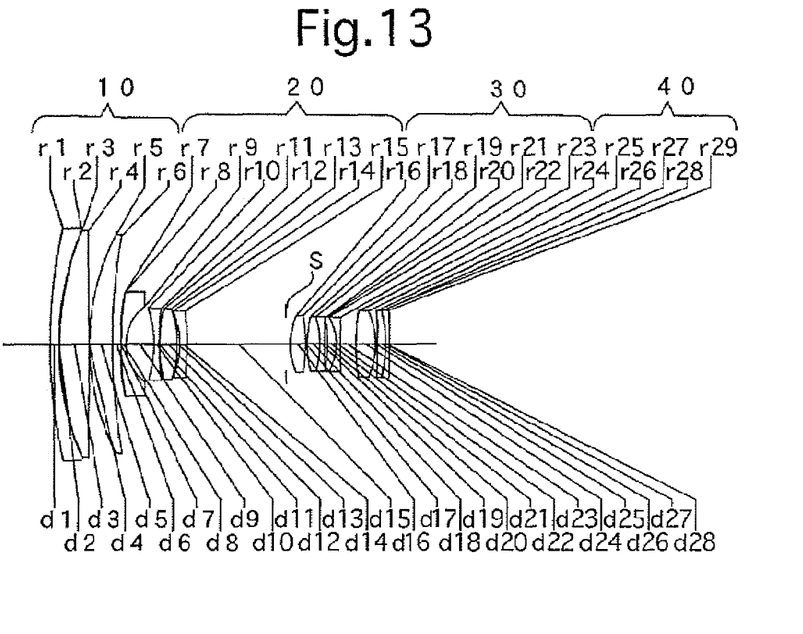
FIG. 13 is a lens arrangement of the wide-angle zoom lens system, at the short focal length extremity, according to a fourth embodiment of the present invention.
Figures 14A, 14B:
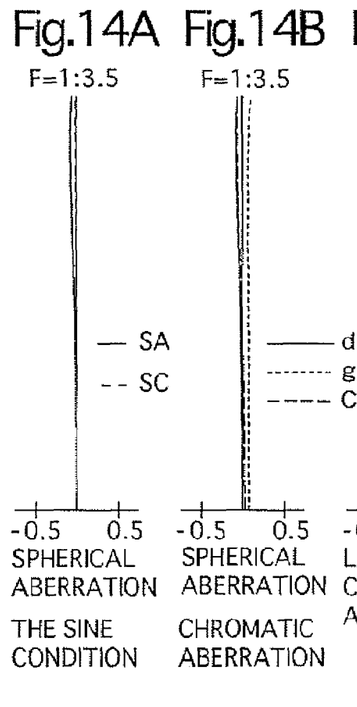
FIGS. 14A, 14B, 14C, 14D and 14E show aberrations occurred in the lens arrangement shown in FIG. 13.
Figures 14C, 14D, 14E:
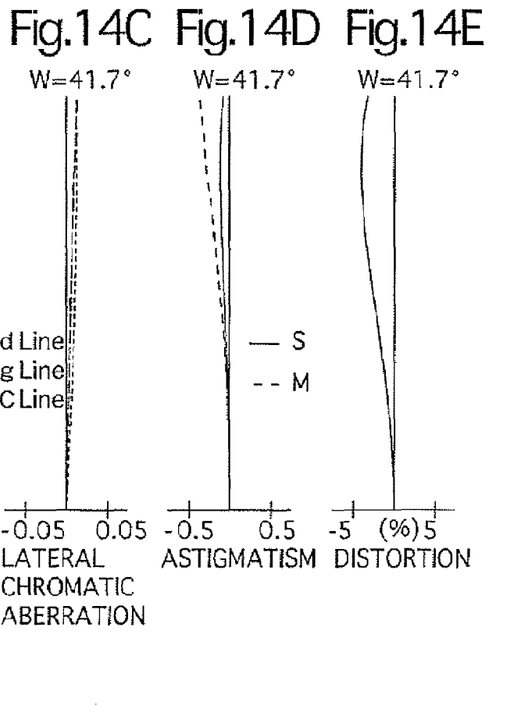

FIG. 13 is the lens arrangement of the wide-angle zoom lens system, at the short focal length extremity, according to a fourth embodiment of the present invention. FIGS. 14A through 14E show aberrations occurred in the lens arrangement shown in FIG. 13.

Figure 15:
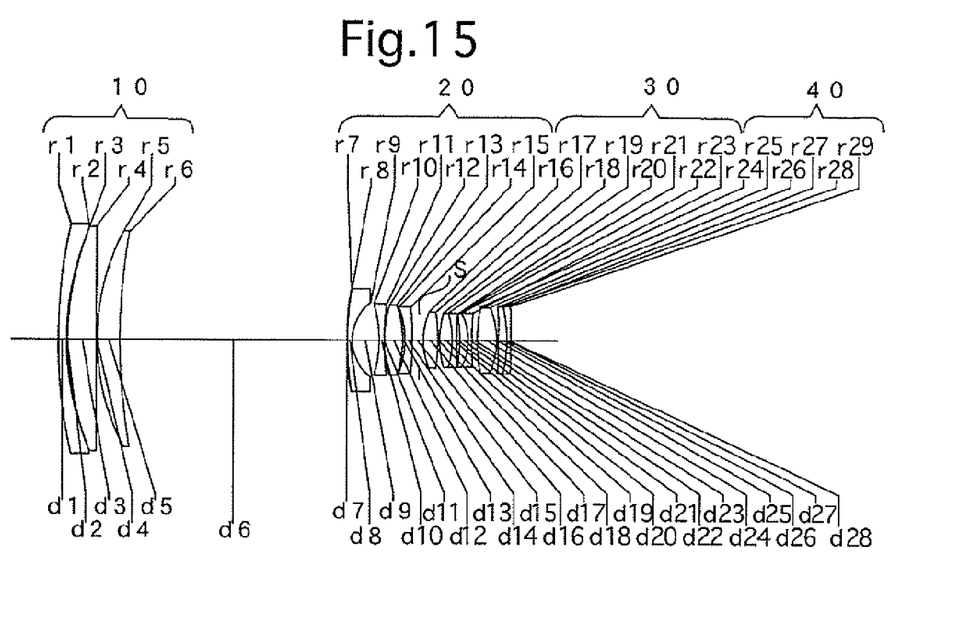
FIG. 15 is a lens arrangement of the wide-angle zoom lens system, at the long focal length extremity, according to the fourth embodiment of the present invention.
Figure 16A:
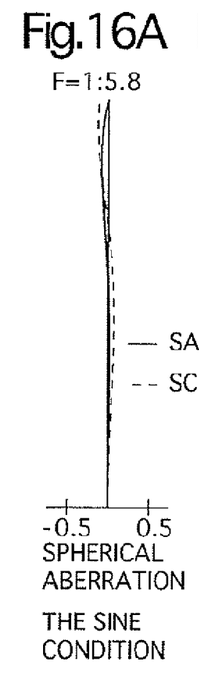
FIGS. 16A, 16B, 16C, 16D and 16E show aberrations occurred in the lens arrangement shown in FIG. 15.
Figures 16B, 16C:
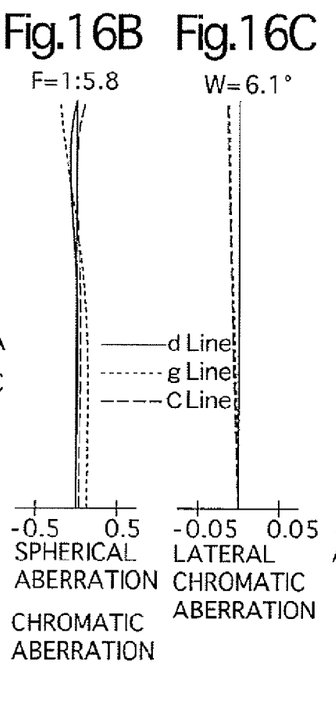
Figure 16D:
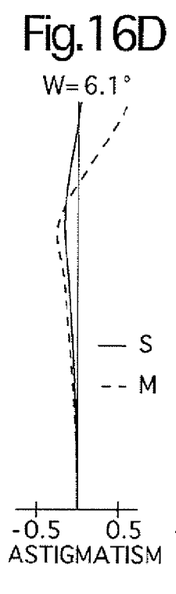
Figure 16E:
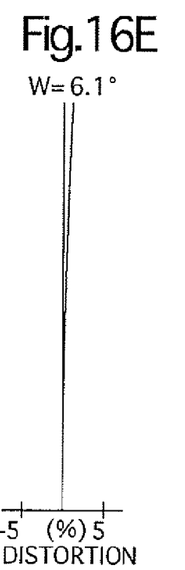

FIG. 15 is the lens arrangement of the wide-angle zoom lens system, at the long focal length extremity, according to the fourth embodiment of the present invention. FIGS. 16A through 16E show aberrations occurred in the lens arrangement shown in FIG. 15.

Table 4 shows the numerical data of the fourth embodiment.

The basic lens arrangement is the same as the second embodiment.

The diaphragm S is provided 1.10 in front of the positive third lens group 30 (surface No. 16) on the optical axis.

TABLE 4

FNO. = 1: 3.5-4.9-5.8
f = 16.48-50.00-131.00
W = 41.7-15.6-6.1
fB = 39.44-63.47-76.49

| Surf. No. | r | d | Nd | ν |
|---|---|---|---|---|
| 1 | 141.414 | 2.20 | 1.84666 | 23.8 |
| 2 | 76.120 | 0.34 | — | — |
| 3 | 78.986 | 7.70 | 1.49700 | 81.6 |
| 4 | −8737.731 | 0.20 | — | — |
| 5 | 62.495 | 6.10 | 1.77250 | 49.6 |
| 6 | 166.603 | 2.20-32.60-60.96 | — | — |
| 7* | 182.863 | 0.10 | 1.52700 | 43.7 |
| 8 | 82.725 | 1.25 | 1.83481 | 42.7 |
| 9 | 12.408 | 7.23 | — | — |
| 10 | −33.422 | 1.40 | 1.83481 | 42.7 |
| 11 | 78.062 | 0.11 | — | — |
| 12 | 35.441 | 4.77 | 1.84666 | 23.8 |
| 13 | −29.134 | 0.63 | — | — |
| 14 | −24.425 | 1.91 | 1.78049 | 43.3 |
| 15 | −113.666 | 27.12-10.32-3.06 | — | — |
| 16 | 18.742 | 3.92 | 1.48749 | 70.2 |
| 17 | −52.119 | 0.50 | — | — |
| 18* | 25.791 | 3.35 | 1.48751 | 70.2 |
| 19 | −27.003 | 1.20 | 1.83400 | 42.7 |
| 20 | 121.370 | 0.80-0.80-0.80 | — | — |
| 21 | −51.087 | 2.38 | 1.75795 | 29.9 |
| 22 | −15.098 | 1.00 | 1.80399 | 39.8 |
| 23 | 94.184 | 4.25-2.21-1.49 | — | — |
| 24 | 47.419 | 5.13 | 1.49700 | 81.6 |
| 25 | −22.856 | 0.50 | — | — |
| 26* | 712.144 | 2.26 | 1.58014 | 41.8 |
| 27 | −39.605 | 0.00 | — | — |
| 28 | −40.788 | 1.00 | 1.84699 | 23.8 |
| 29 | −556.426 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.25348 \times 10^{-4}$ | $-0.53825 \times 10^{-7}$ | $0.58240 \times 10^{-10}$ |
| 18 | 0.00 | $-0.18060 \times 10^{-5}$ | — | — |
| 26 | 0.00 | $-0.41047 \times 10^{-4}$ | $-0.71683 \times 10^{-7}$ | $-0.67512 \times 10^{-9}$ |

The numerical values of each condition for each embodiment are shown in Table 5.

TABLE 5

|  | Embod. 1 | Embod. 2 | Embod. 3 | Embod. 4 |
|---|---|---|---|---|
| Cond. (1) | 6.74 | 6.65 | 6.61 | 6.66 |
| Cond. (2) | 7.80 | 7.60 | 7.47 | 7.58 |
| Cond. (3) | 3.43 | 3.49 | 4.09 | 3.48 |
| Cond. (4) | 1.63 | 1.63 | 2.01 | 1.61 |
| Cond. (5) | 1.23 | 1.28 | 1.16 | 1.30 |
| Cond. (6) | 0.37 | 0.38 | 0.39 | 0.39 |

As can be understood from Table 6, the first through fourth embodiments satisfy conditions (1) through (6). Furthermore, as can be understood from the aberration diagrams, the various aberrations are adequately corrected.

According to the above description, a wide-angle zoom lens system of a four-lens-group arrangement, i.e., negative, positive, negative and positive lens groups, in this order from the object, having the following features can be obtained:

(i) being suitable for a digital SLR camera having a smaller imaging device;

(ii) the angle-of-view of approximately 80° at the short focal length extremity; and (iii) a zoom ratio exceeding 8.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle zoom lens system comprises a positive first lens group, a negative second lens group, a positive third lens group and a positive fourth lens group, in this order from an object, wherein upon zooming from the short focal length extremity to the long focal length extremity, a distance between said positive first lens group and said negative second lens group increases, a distance between said negative second lens group and said positive third lens group decreases, and a distance between said positive third lens group and said positive fourth lens group decreases;

wherein said wide-angle zoom lens system satisfies the following conditions:

$6.0 < f1/fw < 8.0$ $7.0 < f1/|f2| < 9.0 (f2 < 0)$ $2.5 < f3/fw < 4.5$ wherein f1 designates the focal length of said positive first lens group;

f2 designates the focal length of said negative second lens group;

f3 designates the focal length of said positive third lens group; and fw designates the focal length of the entire wide-angle zoom lens system at the short focal length extremity.

2. The wide-angle zoom lens system according to claim 1, further satisfying the following condition:

$1.0 < f3/f4 < 2.5$ wherein f3 designates the focal length of said positive third lens group; and f4 designates the focal length of said positive fourth lens group.

3. The wide-angle zoom lens system according to claim 1, wherein said positive third lens group comprises a positive 3a-sub-lens group and a negative 3b-sub-lens group, in this order from the object; and
wherein said wide-angle zoom lens satisfies the following conditions:

$1.0 < f4/f3a < 2.0$ $0.2 < f2/f3b < 0.5$ wherein
f4 designates the focal length of said positive fourth lens group;
f2 designates the focal length of said negative second lens group;
f3a designates the focal length of said positive 3a-sub-lens group (>0); and
f3b designates the focal length of said negative 3b-sub-lens group(<0).

4. A wide-angle zoom lens system comprises a positive first lens group, a negative second lens group, a positive third lens group and a positive fourth lens group, in this order from an object,
wherein upon zooming from the short focal length extremity to the long focal length extremity, a distance between said positive first lens group and said negative second lens group increases, a distance between said negative second lens group and said positive third lens group decreases, and a distance between said positive third lens group and said positive fourth lens group decreases;
wherein said positive third lens group comprises a positive 3a-sub-lens group and a negative 3b-sub-lens group, in this order from the object;
wherein said wide-angle zoom lens satisfies the following conditions:

$1.0 < f3/f4 < 2.5$ $1.0 < f4/f3a < 2.0$ $0.2 < f2/f3b < 0.5$ wherein
f3 designates the focal length of said positive third lens group;
f4 designates the focal length of said positive fourth lens group;
f2 designates the focal length of said negative second lens group;
f3a designates the focal length of said positive 3a-sub-Lens group (>0); and
f3b designates the focal length of said negative 3b-sub-lens group(<0).

5. The wide-angle zoom lens system according to claim 4, wherein said negative 3b-sub-lens group, which is positioned on the image-side of said positive 3a-sub-lens group, comprises cemented lens elements having a positive lens element and a negative lens element.

6. The wide-angle zoom lens system according to claim 3, wherein said negative 3b-sub-lens group, which is positioned on the image-side of said positive 3a-sub-lens group, comprises cemented lens elements having a positive lens element and a negative lens element.

* * * * *